United States Patent [19]

Weiss et al.

[11] Patent Number: 4,487,745
[45] Date of Patent: Dec. 11, 1984

[54] OXIMES AS OXYGEN SCAVENGERS

[75] Inventors: Charles O. Weiss, Plainsboro; Dwight E. Emerich, Lincoln Park, both of N.J.

[73] Assignee: Drew Chemical Corporation, Boonton, N.J.

[21] Appl. No.: 528,255

[22] Filed: Aug. 31, 1983

[51] Int. Cl.³ ............................................... C23F 11/04
[52] U.S. Cl. ..................................... 422/16; 210/750; 252/392
[58] Field of Search ................... 210/698, 750; 422/14, 422/16; 252/178, 180, 181, 390, 394, 392

[56] References Cited

U.S. PATENT DOCUMENTS 4,067,690 1/1978 Cuisia et al. ........................... 422/16
4,350,606 9/1982 Cuisia ................................... 252/392

FOREIGN PATENT DOCUMENTS 2354207 5/1975 Fed. Rep. of Germany ........ 422/16

Primary Examiner—Thomas Wyse
Attorney, Agent, or Firm—Walter H. Schneider

[57] ABSTRACT

The removal of dissolved oxygen from aqueous systems, such as steam generating systems, thereby inhibiting the corrosion of metal surfaces by adding to the system a composition in which the effective component is an oxime of the formula:

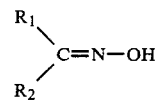

in which $R_1$ and $R_2$ are the same or different and are selected from hydrogen, lower alkyl groups of 1–8 carbon atoms and aryl groups.

12 Claims, No Drawings

OXIMES AS OXYGEN SCAVENGERS

BACKGROUND OF THE INVENTION

1. Field of the Invention

The present invention relates generally to oxygen corrosion inhibitors. More particularly, the present invention relates to a composition for inhibiting the oxygen corrosion of metal surfaces in liquid systems. Still more particularly, the present invention relates to an oxygen scavenging composition, and a method of using such composition, for the control of metal corrosion in steam generating systems, and the like.

2. Description of the Prior Art

The presence of dissolved oxygen in water sustains the corrosion of iron and steel especially under heat transfer conditions such as are found, for instance, in steam generation and similar processes. In order for such processes to function ideally, therefore, it is necessary to remove oxygen from such aqueous systems so as to maintain the oxygen concentration at an optimal minimum level, a necessity that becomes more critical the larger the generating system and the higher the operating pressure become. The major portion of dissolved oxygen is removed from steam generating systems, especially large and complex systems, by mechanically treating the makeup water stream, as well as the recycle condensate stream, in a deaerating feedwater heater situated upstream of the steam boiler. Even under optimum operating conditions, however, it is usually not possible to mechanically reduce the oxygen concentration below 0.007 ppm. It has been the practice, therefore, to augment mechanical oxygen reduction with a chemical reduction treatment so as to further reduce the oxygen concentration to a minimum level that is usually selected on the basis of economic considerations.

Sodium sulfite has long been used in chemical treatment of oxygen-bearing steam boiler water, particularly in low and medium pressure steam generating systems. Its use, however, is generally avoided in high pressure systems because carryover to the steam turbines caused by dissolved solids concentration, e.g., sulfite residual and by-product sodium sulfate, increases with pressure. A second reason is the possibility of thermal breakdown of the sodium sulfite to corrosive sulfur dioxide and hydrogen sulfide. Accordingly, hydrazine, the reaction products of which are inert and do not add to the dissolve solids content of the boiler water, has generally been employed as an oxygen scavenger in high pressure steam generating systems. The advantages of hydrazine, moreover, have been extended to low and medium pressure systems, in which its rate of scavenging action had been too slow for commercial adaptation, by the use of catalysts such as, for example, certain pyrazolidones and aminophenols as disclosed in U.S. Pat. No. 3,728,281. These compounds have the effect of speeding up the rate of scavenging action of hydrazine. Notwithstanding these advantages of hydrazine as an oxygen scavenger, it has, nevertheless, the disadvantage of requiring special handling because it is toxic.

Various other materials and compositions have been proposed, from time to time, as oxygen scavengers or oxygen corrosion inhibitors for use in steam generating systems, secondary oil well recovery systems and other types of corrosive liquid systems. U.S. Pat. No. 3,625,888 suggests, for example, the use of a carbonylbisulfite addition product in combination with a small amount of a transition metal, such as cobalt, as being particularly suited for use as a corrosion inhibitor in oil well water-flooding procedures. Various amine alcohols disclosed as novel in U.S. Pat. No. 3,954,873 are suggested as useful as metal corrosion inhibitors. A composition comprising a hydrazine compound, e.g., a mono- or dialkyl hydrazine, and a saturated or unsaturated organic acid, e.g., an alkyl acid of 3-26 carbon atoms, is disclosed in U.S. Pat. No. 3,629,111 as a corrosion inhibitor in hydraulic fluids designed for fluid pressure operating devices. U.S. Pat. No. 3,962,113 discloses mono-, di- and trialkyl hydrazines as oxygen scavengers particularly adapted for use in steam generating systems, while U.S. Pat. No. 3,983,048 discloses similar oxygen scavengers used in combination with aryl amines. Other hydrazine-based oxygen scavenging compositions are disclosed in U.S. Pat. Nos. 4,192,844 and 4,238,349, while hydroquinone, hydroxylamines and carbohydrazide are disclosed as oxygen scavengers for use in steam generating systems in U.S. Pat. Nos. 4,278,635; 4,067,690 and 4,269,717, respectively.

SUMMARY OF THE INVENTION

Notwithstanding the varying degrees of success demonstrated by the several oxygen corrosion inhibitors described above particularly for use with steam generating systems, there remains a continued need for alternate and improved means for inhibiting oxygen corrosion in such systems. It is a principal object of this invention to fulfill this need. It is a further object of this invention to provide a composition for inhibiting oxygen corrosion of metal surfaces in aqueous systems. It is a still further object of this invention to provide an oxygen scavenging composition particularly suited for use in controlling metal corrosion in steam generating systems employing temperatures ranging from 281° F. to 637° F. and pressures ranging from 50-2000 psi. Another object of this invention is to provide an oxygen scavenging composition that functions equally as well under all of these temperature and pressure conditions. A further object of this invention is the provision of an oxygen scavenging composition of sufficiently low toxicity as not to require special handling. Still other objects of the invention are the provision of an oxygen scavenging composition that does not react to produce dissolved carryover solids, and which does not break down under severe thermal conditions to yield corrosive reaction products.

DESCRIPTION OF THE PREFERRED EMBODIMENT

These various objects have been met in accordance with the present invention by providing an oxygen corrosion inhibiting composition in which the effective component is an oxime having the general formula:

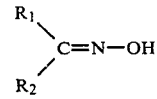

in which $R_1$ and $R_2$ can be the same or different and are selected from hydrogen, or lower alkyl groups of 1-8 carbon atoms, or aryl groups such as phenyl, benzyl or tolyl.

Certain oximes have heretofore been suggested as useful as corrosion inhibitors. U.S. Pat. No. 3,683,024, for instance, discloses a novel class of o-polyalkoxylated high molecular weight n-alkanone and n-alkanal oximes, and suggests that these compounds have utility as anti-rust additives in combination with fuels. The oximes of the patent, however, are of an entirely different class from the oxime oxygen scavengers of the present invention. More important, however, is the fact that the patent does not suggest, even in remote terms, the possible use of the oximes disclosed therein, much less the oximes of the present invention, as suitable for use as oxygen corrosion inhibitors in high temperature and pressure systems, such as steam generating systems, to which the present invention is particularly directed.

The oximes of the present invention, including the preferred methylethylketoxime and acetaldoxime, are water soluble and, accordingly, may be introduced into the steam generating system either in their solid or liquid forms, or as an aqueous solution. Because they are also steam volatile, moreover, the oximes of this invention provide an added advantage when used in steam generating systems by protecting against oxygen in-leaking that may occur in the steam condensate system.

The amount of oxime oxygen scavenger employed in accordance with this invention will, of course, be that necessary to take up the oxygen content existing in any particular situation. Normally, about 3–5 parts by weight of oxime will be required to remove 1 part by weight of dissolved oxygen. In practice, however, the normal practice will be to measure the oxime employed in terms of the amount of water being treated. In general, therefore, the oxime will be employed in any amount ranging from 0.001–500 parts of oxime per one million parts of water being treated, which, more usually, will be on the order of 1.0–50 parts per million of oxime.

The following examples further illustrate the invention in which all parts are by weight unless otherwise indicated.

EXAMPLE 1

A 1 liter deionized aqueous solution buffered to pH 8.0 was saturated with atmospheric oxygen in a constant temperature bath maintained at 90° C. To the rapidly stirred solution was injected 0.217 ml. (0.200 gr.) of methylethylketoxime so as to give an initial concentration of 200 ppm. The thoroughly mixed solution was then poured into 160 ml. glass bottles, sealed to prevent air gaps and returned to the constant temperature 90° C. water bath. Periodically a bottle of the aqueous solution was removed from the constant temperature bath and the dissolved oxygen concentration thereof determined by means of an Orion Model 97-08 oxygen electrode. The results appear in Table I.

TABLE I

| Time (min) | Oxygen Conc. (ppm) |
| --- | --- |
| 0 | 3.08 |
| 10 | 2.82 |
| 20 | 2.59 |
| 40 | 2.22 |
| 60 | 1.84 |
| 80 | 1.76 |

EXAMPLE 2

When the procedure of Example 1 was repeated replacing the methylethylketoxime with acetaldoixme, similar oxygen scavenging was obtained as evidenced by the data of Table II.

TABLE II

| Time (min) | Oxygen Conc. (ppm) |
| --- | --- |
| 0 | 3.04 |
| 5 | 2.97 |
| 10 | 2.86 |
| 20 | 2.55 |
| 30 | 2.07 |
| 40 | 1.56 |
| 60 | 0.99 |

EXAMPLE 3

When the procedure of Example 1 was repeated replacing the methylketoxime with butyraldoxime, similar oxygen scavenging was again obtained as shown by the data of Table III.

TABLE III

| Time (min) | Oxygen Conc. (ppm) |
| --- | --- |
| 0 | 2.80 |
| 5 | 2.63 |
| 10 | 2.46 |
| 20 | 2.24 |
| 30 | 1.82 |
| 40 | 1.55 |
| 60 | 0.94 |

EXAMPLE 4

When the test procedures of Examples 1–3 are repeated under temperature and pressure conditions that prevail in medium and high pressure steam generating systems, oxygen scavenging is observed.

Reference in this disclosure to details of specific embodiments is not intended to restrict the scope of the appended claims, which themselves recite those features regarded as essential to the invention.

We claim:

1. A composition for treating aqueous systems, such as steam generating systems, so as to remove dissolved oxygen therefrom thereby inhibiting the corrosion of metal surfaces comprising an effective amount of an oxime of the formula:

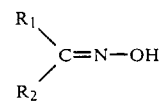

in which $R_1$ and $R_2$ are the same or different and are selected from hydrogen, lower alkyl groups of 1-8 carbon atoms or aryl groups.

2. A composition according to claim 1 in which the oxime is methylethylketoxime.

3. A composition according to claim 1 in which the oxime is acetaldoxime.

4. A composition according to claim 1 in which the oxime is butyraldoxime.

5. A composition according to claim 1 in which the oxime is propionaldoxime.

6. A method of treating an aqueous system, such as a steam generating system, so as to remove dissolved oxygen therefrom thereby inhibiting the corrosion of metal surfaces, which comprises adding to said system an effective amount of an oxime of the formula:

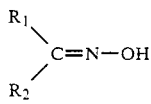

in which $R_1$ and $R_2$ are the same or different and are selected from hydrogen, lower alkyl groups of 1-8 carbon atoms or aryl groups.

7. A method according to claim 6 in which the oxime is added in an amount equivalent to 0.1-500 ppm of aqueous system to be treated.

8. A method according to claim 7 in which the oxime is added as an aqueous solution.

9. A method according to claim 8 in which the oxime is methylethylketoxime.

10. A method according to claim 8 in which the oxime is acetaldoxime.

11. A method according to claim 8 in which the oxime is butyraldoxime.

12. A method according to claim 8 in which the oxime is propionaldoxime.

* * * * *